INVENTORS
HERBERT DYM
ROBERT V. MAZZA

BY
ATTORNEY

United States Patent Office 3,418,481
Patented Dec. 24, 1968

3,418,481
ILLUMINATION DETECTOR USING A PLURALITY OF LIGHT SENSITIVE DIODE PAIRS
Herbert Dym and Robert V. Mazza, Mahopac, N.Y., assignors to International Business Machines Corporation, New York, N.Y., a corporation of New York
Filed Dec. 28, 1964, Ser. No. 421,460
19 Claims. (Cl. 250—211)

ABSTRACT OF THE DISCLOSURE

The disclosure describes a plurality of back-to-back connected light sensitive diode pairs. The diode pairs are arranged along a line or in a plane. One end of each of the diode pairs are connected in common to a signal source such as a ramp voltage generator. The other end of each of the diode pairs are connected in common to an output detector circuit such as a differentiator and amplifier. When one or more of the diode pairs are exposed to light, an output signal is produced. The time of occurrence of the output signal is an indication of the intensity of the light, and the amplitude of the output signal at a given time is an indication of the number of diodes receiving a particular light intensity.

---

This invention relates to illumination detectors and more particularly to a detector which gives an output indicating both the degree of intensity of illumination and its distribution.

There are many applications wherein it is desirable to determine accurately the amount of light on a particular area. In some applications it is important to know the intensity of the highest illumination, the lowest illumination, and points in between. It may also be desirable to know the total area being illuminated at the various intensities. One such application is in determining the exposure for printing of photographs from photographic negatives.

In other applications there may be only two degrees of illumination where, for example, a low degree of illumination indicates the presence of an object which blocks light and a high degree of illumination indicates the absence of the object.

Where the shapes are continuous and sufficiently large, such devices as planimeters may be used to determine area but their use is time consuming. If the shapes are discontinuous, such as cells on a microscope slide, the use of such devices may be impractical.

Known prior art devices scan an image by means of a flying spot scanner, image dissector or equivalent apparatus, and process the incremental returns to obtain the same results.

With the present device it is possible to determine almost instantaneously both the intensities of illumination and the sums of areas illuminated at various intensities.

In operation, the present device is exposed to the illumination to be measured. All areas of the device are responsive to illumination, with the speed of response being a measure of the intensity of the illumination. The greater the intensity, the faster the device will produce an output. When the illumination varies over the area in question, the areas exposed to greater intensity will produce outputs before the areas exposed to lesser intensities. The output time may be calibrated to give a direct reading of intensity.

As a ramp voltage is applied to the device, all incremental areas exposed to the same intensity of illumination produce outputs at the same time. These outputs are added and the accumulated outputs may be calibrated to give a direct reading of the sums of the incremental areas exposed to the same intensity of illumination.

Thus, the output at a particular time represents a particular intensity of illumination while the amplitude of the output at that time represents the number of incremental areas exposed to that intensity of illumination.

An object of this invention is to provide an improved intensity detector.

Another object of this invention is to provide an improved area detector.

A further object of this invention is to provide an improved area and intensity detector.

Yet another object is to provide apparatus for measuring the intensity and distribution of incident light.

The foregoing and other objects, features and advantages of the invention will be apparent from the following more particular description of a preferred embodiment of the invention, as illustrated in the accompanying drawings.

Figure 1:
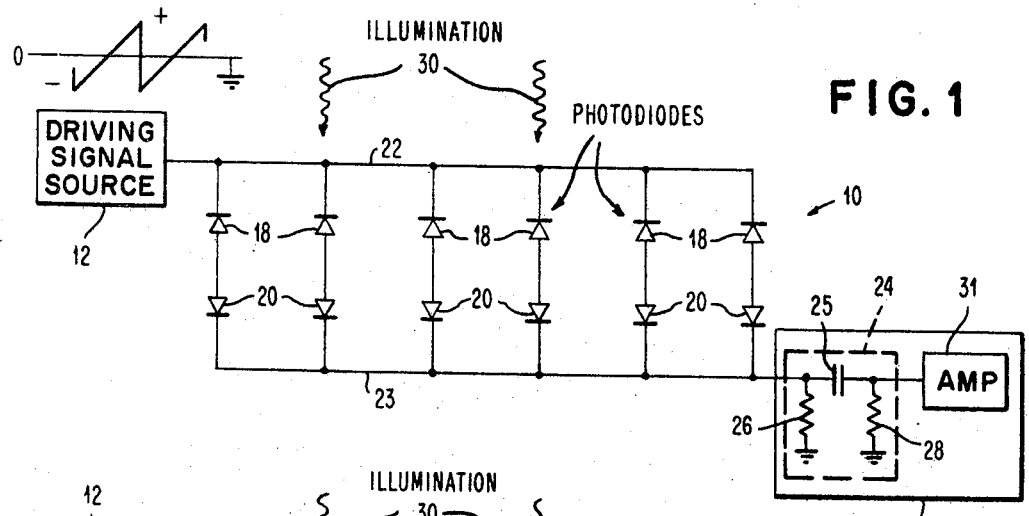
FIG. 1 is a schematic representation of the device.

Referring to FIG. 1, the device consists of a diode unit generally designated 10, a driving voltage source 12 and an output detector 14. The unit 10 consists of an upper group of photosensitive diodes connected in opposed conducting relationship with a lower group of blocking diodes 20. The upper end of each of the photodiodes 18 is connected to a common conductor 22 which in turn is connected to the driving voltage source 12. Thus, the voltage produced by the source 12 will be applied in parallel to each of the diodes 18. The lower end of each blocking diode 20 is connected to a common conductor 23 which in turn is connected to the detector 14. The detector 14 includes a differentiator 24. In the illustrated embodiment, the differentiator consists of a capacitor 25 having its left side connected through a resistor 26 to ground whereas the right side of capacitor 25 is connected through a resistor 28 to ground. The pattern of illumination to be measured, which is indicated schematically by the arrows 30, is directed onto the photodiodes 18.

The device will be described first under conditions of no significant time delay and thereafter will be described where there is a significant time delay.

*Without significant time delay*

In the present example, the driving voltage source 12 is considered to generate a repetitious linear ramp voltage varying from a negative potential to a positive potential. In the initial state, with the ramp voltage at the negative value, it is apparent, with the conductor 23 connected through resistor 26 to ground that each blocking diode 20 is back biased and therefore is conducting only its leakage current. At the same time, each of the photodiodes 18 is forward biased but is still only conducting the leakage current of the corresponding diode 20.

As the ramp voltage from source 12 rises and passes through the 0 value, the back biased state of the blocking diodes 20 changes to a forward bias state while the forward bias state of the photodiodes 18 changes to a back biased state. It is apparent that each diode pair which includes an unilluminated photodiode now conducts only the leakage current of the photodiode, which current is relatively small. However, each photodiode which is illuminated conducts a larger current (proportional to the incident light) which also is conducted through the associated forward biased diode 20. This current flows through the conductor 23 and through the resistor 26 to ground and, due to the voltage drop across the resistor 26, raises the potential of the left side of the capacitor 25 to a relatively positive value. The voltage drop across the resistor 26 should not be of a magnitude significantly larger than the saturation voltage of one or the other of the forward biased diodes and generally should be small relative to the amplitude of the ramp voltage from source 12. This change of potential in a positive direction is differentiated by the RC circuit 25–28 and is detected by a unit 31 which is essentially an amplifier. The amplifier may, for example, be included as a part of an oscilloscope whereby the output is observable.

Since all diode pairs are connected in parallel between conductors 22 and 23, it is apparent that the amount of current flowing through the conductor 23 and resistor 26 to ground is dependent upon the number of diodes 18 which are exposed to illumination. The value of this current also determines the magnitude of the voltage drop across the resistor 26. There is a corresponding increase in the derivative of the current which derivative is detected by the unit 31. Thus, where all incident light is of the same intensity, the magnitude of the output detected by the unit 31 is indicative of the number of photodiodes which are illuminated.

*With significant time delay*

Figure 2:
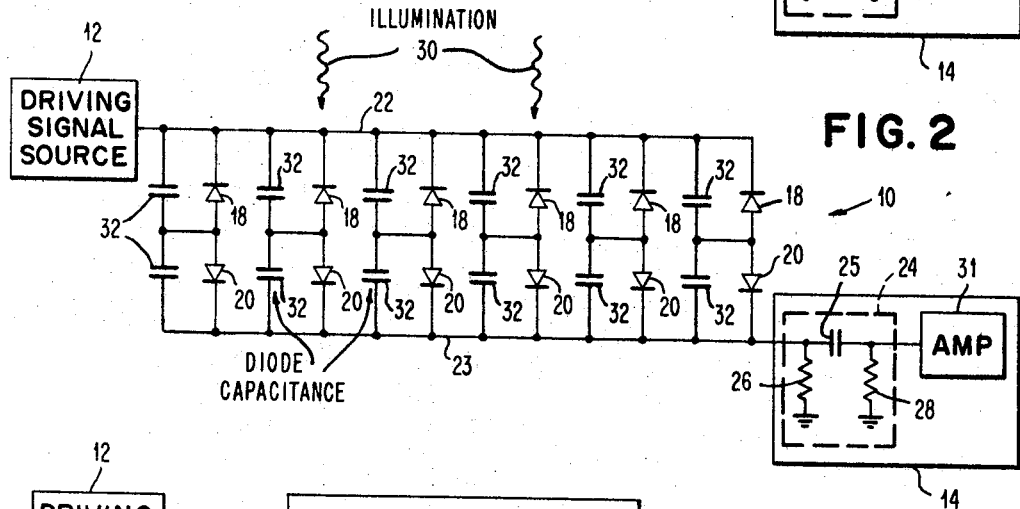
FIG. 2 is a schematic representation of the device with the diode capacitance schematically illustrated in dotted outline.

In addition to determining the number of photodiodes which are illuminated, it is desired to determine how many photodiodes are illuminated by various intensities of light. It is a characteristic of back-to-back diodes that the capacitance associated with the diode junction may cause a delay in current switching when a sweep voltage is applied. The delay becomes significant when capacitive current $$\left(i_c = c\frac{dv}{dt}\right)$$

becomes comparable to or larger than the reverse saturation current of the diode pair. As the capacitive current increases, the delay becomes a greater portion of the sweep cycle. Referring to FIG. 2, the capacitance is schematically indicated by capacitors 32 connected in parallel with the diodes. The capacitance of the diodes may be controlled in the process of fabrication to control the time delay. Also, capacitors 32 may be connected in parallel with diodes in accordance with the showing of FIG. 2.

In the case of photodiodes, when operating at an appropriate light level and voltage sweep speed, the switching of current does not occur as the voltage passes through 0, but rather is delayed. The amount of delay is a function of the light intensity. The lower the light, the greater the delay.

Figure 5:
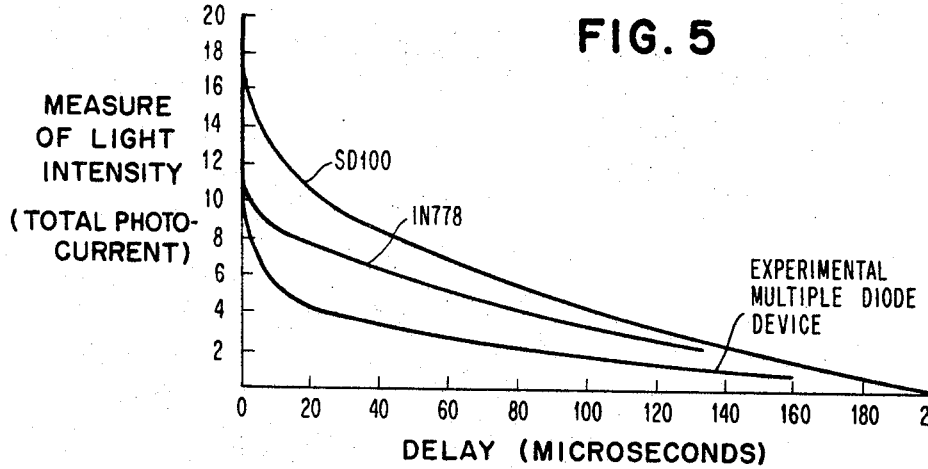
FIG. 5 is a graph illustrating the relationship between the photo-current and the switching time.

Referring to FIG. 5, exemplary curves are shown for three different types of diode devices. These curves illustrate how the time delay changes appreciably with changes in total photo-current which, in turn, is a measure of the amount of illumination on the photodiode. These devices have been operated with delays ranging from milliseconds to tenths of microseconds.

It is apparent, from FIG. 5, that the effect of light intensity on the output is not linear with time and therefore the horizontal scale which is applied to the output cannot be a linear scale. Of course, at either end of the curves shown in FIG. 5, there are portions which approach linearity. The vertical scale which is representative of the number of diodes exposed to a particular light intensity, is linear with area and also is a function of intensity. Thus, a scale factor may be used to compensate the output amplitude in time.

Figure 4:
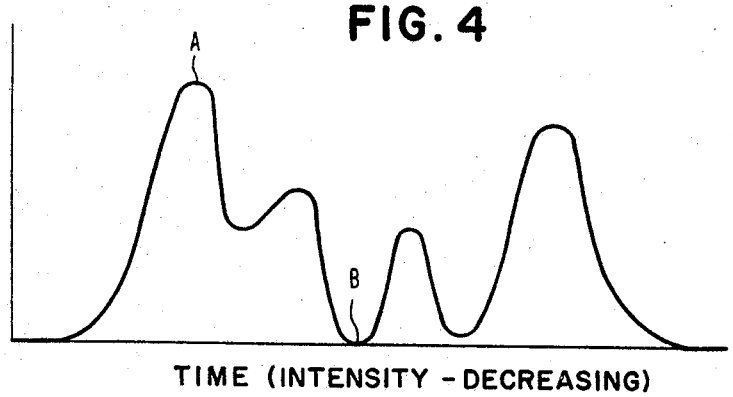
FIG. 4 is a graph illustrating the output from the device.

The device may be used to show intensity distributions over an extremely wide range of light levels merely by adjusting the sweep speed of the ramp voltage from source 12. Brighter light levels require higher sweep speed in order to make the smaller delays an observable percentage of the sweep time. For example, if the maximum and minimum light levels which produce useful delays at one sweep speed were measured in units which read 10 and 1, respectively, then when the sweep speed is increased ten times, the new light levels read at 100 and 10. In this way, the light levels which a single device can accommodate range from low levels producing photocurrents approaching the order of magnitude of dark currents, to light so bright that the device is limited by the attainable speed of the external sweep and detection circuitry. This will readily cover light ratios of 3 to 4 orders of magnitude. With the appropriate range of light intensity applied to the device, a continuous output such as that shown in FIG. 4 may be obtained which represents the distribution of light intensities along the horizontal axis and the area illuminated at various intensities along the vertical axis. For example, the point labeled A indicates a large number of diodes lighted by the intensity of light which produces an output at the delay time indicated by the position of A along the horizontal axis. Similarly, point B indicates no diodes lighted by the corresponding intensity.

Figure 3:
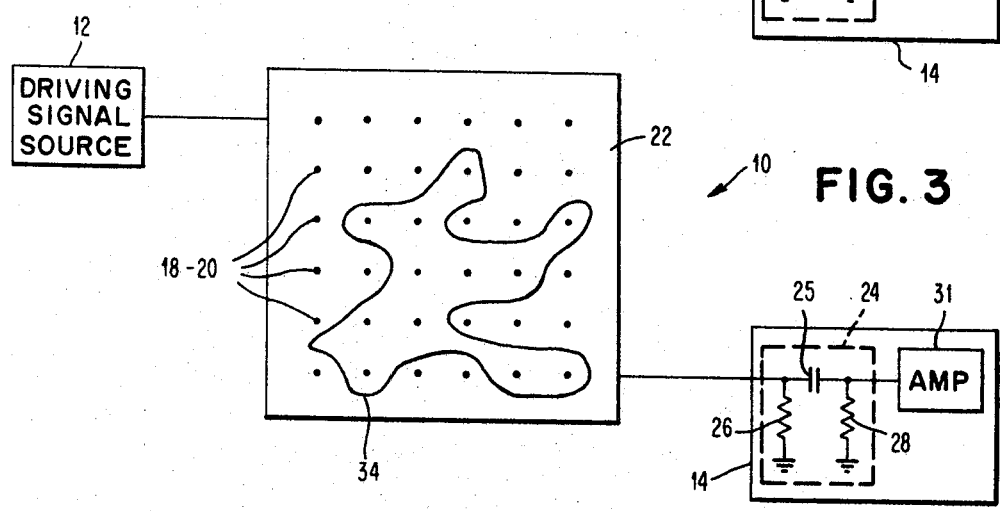
FIG. 3 is a schematic representation of an area detector.

There is virtually no limit on the number of diodes which may be used and they may be placed in any desired array. For example, they may be used in a single row as illustrated in FIG. 1, or in an array consisting of a matrix of diodes as represented in FIG. 3 which shows a 6 x 6 array of diodes 18–20. The detector may also be a continuous type fabricated from a three layer NPN or PNP wafer, or may consist of individual diodes or diode pairs connected together.

In FIG. 3, assuming the pattern 34 to be of a single intensity and the device to be properly calibrated, the device will indicate, in a single cycle of the sweep voltage, that the configuration 34 covers one-third of the total number of diodes. Similarly, even if the configuration 34 consisted of a number of smaller configurations, it would indicate the portion of the total number of diodes which are covered.

Figure 6:
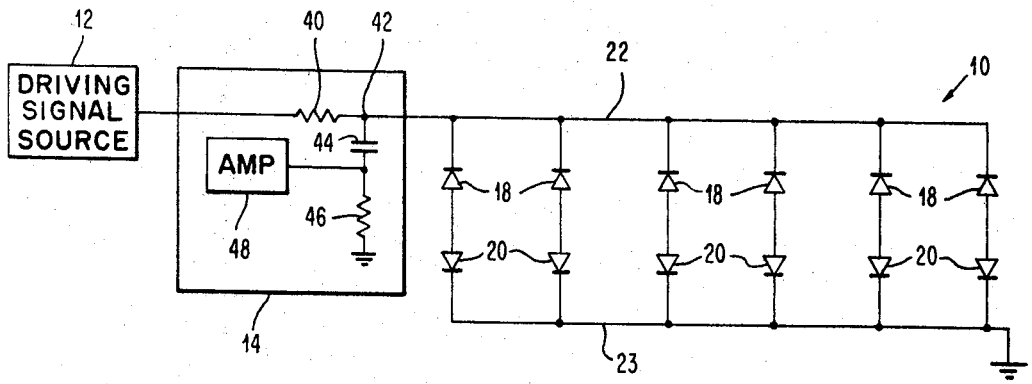
FIG. 6 is a schematic illustration of an alternate embodiment.

Referring to FIG. 6, the detector unit 14 may be placed between the driving signal source 12 and the diode unit 10 with the other side of the diode pairs being connected to a suitable bias, for example, ground. In this embodiment the detector 14 consists of a resistor 40 connected in series in the conductor 22 between units 10 and 12. At a point 42 between the resistor 40 and unit 10, a series RC circuit 44–46 is tapped off and connected to ground. At the midpoint of the RC circuit an amplifier 48 is connected to detect derivatives of the current in resistor 40.

If a continuous type three layer wafer is used, it may be considered to consist of an infinite number of diode pairs. While it is only necessary that one diode of each pair be a photosensitive diode, both may be photosensitive.

While the invention has been particularly shown and described with reference to a preferred embodiment thereof, it will be understood by those skilled in the art that the foregoing and other changes in form and details may be made therein without departing from the spirit and scope of the invention.

What is claimed is:
1. Light intensity detecting apparatus comprising:
a plurality of pairs of diodes spatially distributed in a predetermined pattern in two dimensions, the diodes in each said pair being series connected in opposed conducting relationship and at least one diode of each pair being photosensitive,
driving signal means connected to one end of all said diode pairs for placing said one end of all said diode pairs at the same selected voltage level at any given time, and output signal detecting means connected to the other end of all said diode pairs.

2. The device of claim 1 wherein said output signal detecting means include means for detecting changes in current.

3. The device of claim 1 wherein said output signal detecting means includes a differentiator.

4. The device of claim 1 wherein said output signal detecting means includes a differentiator and an amplifier.

5. Light intensity detecting apparatus comprising:
first conductor means,
second conductor means
a plurality of pairs of diodes spatially distributed in a predetermined pattern in two dimensions, the diodes in each said pair being series connected in opposed conducting relationship and all diode pairs being connected in parallel between said first and second conductor means with at least one diode of each pair being photosensitive,
driving signal means connected to said first conductor means for placing one end of all said diode pairs at the same selected voltage level at any given time, and
output signal detecting means connected in series between said driving signal means and said first conductor means.

6. The device of claim 5 wherein said output signal detecting means include means for detecting changes in current.

7. The device of claim 5 wherein said output signal detecting means include a differentiator.

8. The device of claim 5 wherein said output signal detecting means include a differentiator and an amplifier.

9. Light intensity detecting apparatus comprising:
a plurality of pair of diodes spatially distributed in a predetermined pattern in two dimensions, the diodes in each said pair being series connected in opposed conducting relationship and at least one diode of each pair being photosensitive,
driving voltage means operable for producing a voltage which changes progressively with respect to time,
first connecting means connecting said driving voltage means to one end of all said diode pairs for placing said one end of all said diode pairs at the same voltage level at the same time,
output signal detecting means, and
second connecting means connecting said output signal detecting means to the other end of all said diode pairs.

10. The device of claim 9 wherein said output signal detecting means include a differentiator and an amplifier.

11. The device of claim 9 including a pair of capacitors corresponding to each said pair of diodes, said pair of capacitors being connected in series between said first and second connecting means with a point between said pair of capacitors connected to a point between said diodes of said corresponding pair of diodes.

12. Light intensity detecting apparatus comprising:
a plurality of pairs of diodes spatially distributed in a predetermined pattern in two dimensions, the diodes in each said pair being series connected in opposed conducting relationship and at least one diode of each pair being photosensitive,
driving voltage means operable for producing a repetitive ramp voltage,
means for connecting said driving voltage means, in parallel, to one end of all said diode pairs for placing said one end of all said diode pairs at the same voltage level at the same time,
output signal detecting means, and
means for connecting said detecting means to the other end of all said diode pairs.

13. The device of claim 12 wherein said output signal detecting means includes means for detecting changes in current.

14. A light sensitive device comprising:
driving signal means,
output signal detector means,
diode means including a succession of pairs of diodes, each pair comprising a first diode and a second diode,
each diode being normally asymmetrically conductive and having a first side of one polarity designation and a second side of another polarity designation with at least one diode of each said pair being photosensitive,
the diodes of each pair being connected in series, with said first side of said first diode connected to said first side of said second diode,
first conductor means commonly connecting said second side of said first diode of each said pair to said driving signal means for placing said second side of each of said first diode of all of said diode pairs at the same voltage level at the same time, and
second conductor means commonly connecting said second side of said second diode of each said pair to said output signal detector means.

15. The device of claim 14 wherein said output signal detector means includes a differentiator.

16. The device of claim 14 including a pair of capacitors corresponding to each said pair of diodes, said pair of capacitors being connected in series between said first and second conductor means with a point between said pair of capacitors connected to said first sides of said corresponding diodes.

17. A light sensitive device comprising:
driving signal means,
output signal detector means,
an array of pairs of diodes, each pair comprising a first diode and a second diode,
each diode being normally asymmetrically conductive and having a first side of one polarity designation and a second side of another polarity designation with at least one diode of each pair being photosensitive,
the diodes of each pair being connected in series with said first side of said first diode connected to said first side of said second diode,
first conductor means commonly connecting said second side of said first diode of each said pair to said driving signal means for placing said second side of each of said first diode of all of said diode pairs at the same voltage level at the same time, and
second conductor means commonly connecting said second side of said second diode of each said pair to said output signal detector means.

18. A light sensitive device comprising:
driving signal means,
output signal detector means,
an array of pairs of diodes, each pair comprising a first diode and a second diode,
each diode being normally asymmetrically conductive and having a first side of one polarity designation and a second side of another polarity designation with at least one diode of each said pair being photosensitive,
the diodes of each pair being connected in series with said first side of said first diode connected to said first side of said second diode,
first conductor means commonly connecting said second side of said first diode of each said pair to said driving signal means for placing said second side of each of said first diode of all of said diode pairs at the same voltage level at the same time,
signal detector means connected in series between said driving signal means and said first conductor means, and
second conductor means commonly connecting said secone side of said second diode of each said pair of a bias source.

19. A light sensitive device comprising:
driving signal means, output signal detector means, diode means including a succession of pairs of diodes, each pair comprising a first diode and a second diode, each diode being normally asymmetrically conductive and having a first side of one polarity designation and a second side of another polarity designation with at least one diode of each said pair being photosensitive, the diodes of each pair being connected in series, with said first side of said first diode connected to said first side of said second diode, first conductor means commonly connecting said second side of said first diode of each said pair to said driving signal means for placing said second side of each of said first diode of all of said diode pairs at the same voltage level at the same time, signal detector means connected in series between said driving signal means and said first conductor means, and second conductor means commonly connecting said second side of said second diode of each said pair to a bias source.

References Cited
UNITED STATES PATENTS

| | | | |
|---|---|---|---|
| 2,892,094 | 6/1959 | Lehovec | 250—211 |
| 3,210,548 | 10/1965 | Morrison | 250—211 |
| 3,311,754 | 3/1967 | Linder et al. | 307—292 |
| 3,317,733 | 5/1967 | Horton et al. | 250—211 |

WALTER STOLWEIN, *Primary Examiner.*

U.S. Cl. X.R.

307—117